L. A. THURN.
MOTOR METER LIGHT.
APPLICATION FILED APR. 16, 1920.
1,390,939.
Patented Sept. 13, 1921.
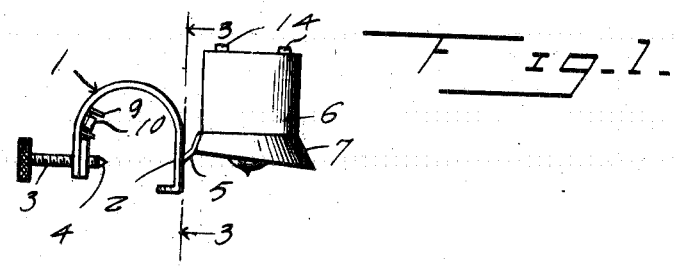
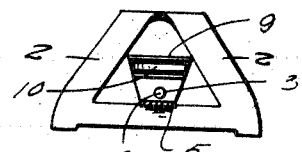
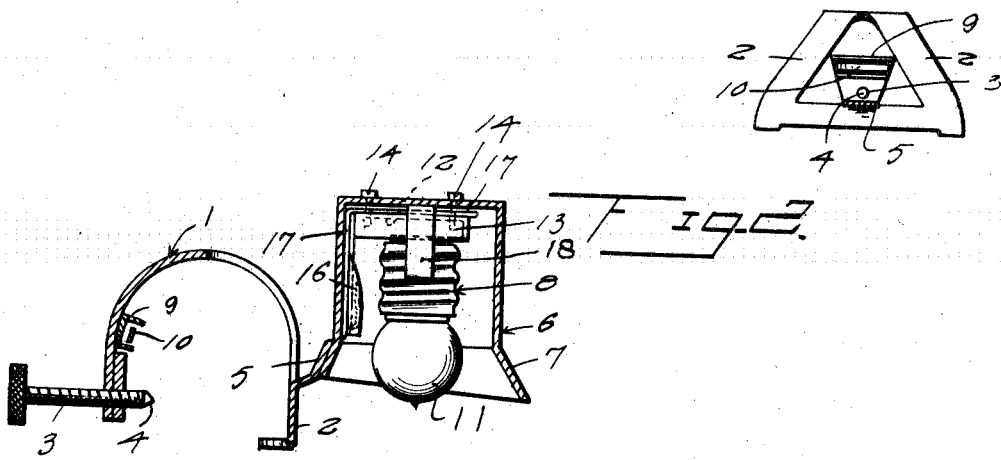
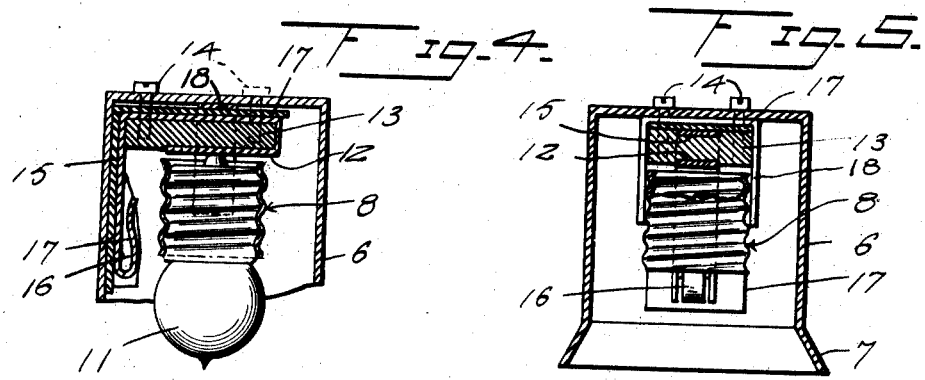
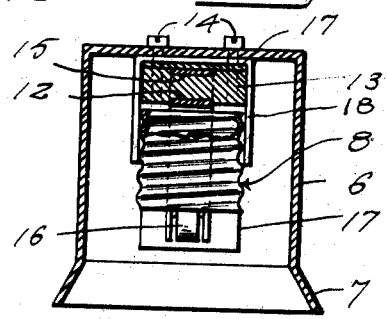
INVENTOR.
L. A. Thurn
BY
ATTORNEY.

UNITED STATES PATENT OFFICE.

LLOYD A. THURN, OF FREMONT, OHIO.

MOTOR-METER LIGHT.

1,390,939.  Specification of Letters Patent.  Patented Sept. 13, 1921.

Application filed April 16, 1920. Serial No. 374,354.

*To all whom it may concern:*

Be it known that I, LLOYD A. THURN, a citizen of the United States, residing at Fremont, in the county of Sandusky and State of Ohio, have invented certain new and useful Improvements in a Motor-Meter Light; and I do hereby declare the following to be a full, clear, and exact description of the invention, such as will enable others skilled in the art to which it appertains to make and use the same.

This invention relates to motor meter lights and it consists in the novel features hereinafter described and claimed.

An object of the invention is to provide a light of simple structure adapted to be applied to the motor meter of an automobile machine and which will cast the rays of light upon the face of the meter in order that the same may be readily observed at night. The structure is such that it may be detached from the motor meter and applied to any other part of the automobile machine when desired or the device may be carried in the hand and used at night when the parts of the automobile are being inspected, or trouble is being looked for.

The device comprises a bracket having a set screw provided with a chisel edge adapted to engage the surface of the part to which the bracket is applied. The bracket carries a hood under which is located a bulb and means are provided for conducting an electric current to and through the bulb whereby the same may be illuminated while the device is in use.

In the accompanying drawing:—

Figure 1 is a side elevation of the motor meter light.

Fig. 2 is a sectional view of the same.

Fig. 3 is a section on line 3—3 of Fig. 1 and Figs. 4 and 5 detailed views of the features of the invention.

The motor meter light includes a bracket 1 preferably of metal and which is substantially arcuate in edge elevation. The bracket 1 is provided at one end with spaced prongs 2 and at its other end portion carries a threaded set screw 3 which is provided with a chisel end 4. The bracket may be applied to the casing of a motor or to any part of the frame of an automobile machine, and when in engagement with the support the prongs 2 engage the support at one side and the inner end of the set screw 3 is brought into engagement with the support at the opposite side, and inasmuch as the set screw is provided with a chisel end 4 the said chisel end will bite into the material of the support and hold the bracket in position thereon.

The bracket 1 is provided at one end and at a point between its edges with a lug 5 upon which is mounted a hood 6. The hood is provided with a visor 7. A socket member 8 is supported within the hood 6 and is connected electrically with the same. The bracket 1 carries a clip 9 having a spring tongue 10 with which an electric wire may be connected in a usual manner. A bulb 11 is adapted to be screwed into the socket member 8 in a usual manner and one of the terminals of the bulb contacts with a plate or conductor 12 when the bulb is in position in the socket member. The plate 12 is carried by a fiber plate or block 13 which is secured to the top of the hood 6 by means of screws 14. An arm 15 connects with the plate 12 and is provided with a clip 16 similar in construction to the clip 9 hereinbefore described and a strip of insulating paper 17 is interposed between the arm 15 and the inner surface of the hood 6. A wire may be connected with the clip 16 in a usual manner. A conductor strip 18 straddles plates 12 and 13 and rests on insulation 17 to mount socket 8.

When the device is in position upon the casing of a motor meter the bulb 11 and the adjacent parts are housed under the hood 6 and protected against rain, frost and the elements in general. When the bulb is illuminated the rays of light will be cast in a downward direction by reflection from the under surface of the visor 7 and will be directed upon the face of the motor meter. Consequently the meter may be observed at night.

From the foregoing description taken in conjunction with the accompanying drawing it will be seen that a motor meter light of simple structure is provided and that the same may be conveniently used to advantage for observing the face of a meter and other parts of an automobile in the dark and night.

Having described the invention what is claimed is:

A lighting fixture of the class described, having a conducting hood, a block of insulating material, a conductor extending over the top and an end thereof and inwardly to provide a contact, the conductor extending downwardly at the other end of the block to provide a terminal, a lamp, a socket therefor to support the same in engagement with the contact having a suspending member straddling the block, means insulating the conductor from the hood and the suspending member, and means to support the block from the upper wall of the hood.

In testimony whereof I affix my signature in presence of two witnesses.

LLOYD A. THURN.

Witnesses:
FRANK BECK,
JACOB LE JEUNE.